United States Patent [19]
Levine et al.

[11] Patent Number: 4,559,939
[45] Date of Patent: Dec. 24, 1985

[54] COMPATIBLE SMOKE AND OXYGEN MASKS FOR USE ON AIRCRAFT

[75] Inventors: Harold H. Levine, Northridge; Peter P. Kavaloski, Los Angeles; Thomas K. Hale, Glendale, all of Calif.

[73] Assignee: Lockheed Corporation, Burbank, Calif.

[21] Appl. No.: 579,238

[22] Filed: Feb. 13, 1984

[51] Int. Cl.$^4$ ............................................. A62B 7/00
[52] U.S. Cl. ..................... 128/201.28; 128/201.15; 128/205.25; 128/912; 128/202.27; 128/205.24; 128/201.25
[58] Field of Search ................... 128/201.22–201.29, 128/205.12, 204.26, 205.24, 205.25, 206.12, 206.15, 206.17, 206.21, 206.28, 207.12, 912, 201.15, 202.27

[56] References Cited

U.S. PATENT DOCUMENTS

| 3,762,407 | 10/1973 | Shonerd | 128/201.23 |
| 4,098,271 | 7/1978 | Maddock | 128/205.25 |
| 4,404,969 | 9/1983 | Cresswell et al. | 128/201.28 |
| 4,440,164 | 4/1984 | Werjefelt | 128/205.25 |
| 4,494,538 | 1/1985 | Ansite | 128/205.25 |

FOREIGN PATENT DOCUMENTS

1085427  7/1960  Fed. Rep. of Germany ........................ 128/204.26

Primary Examiner—Henry J. Recla
Attorney, Agent, or Firm—Louis L. Dachs

[57] ABSTRACT

The invention is a smoke mask and oxygen mask combination that can be coupled together so that protection from toxic fumes and supplemental oxygen gas can be provided to the passenger during a concurrent fire and decompression aboard an aircraft. A protrusion 70' of a smoke mask 26' is provided with a flat surface 230 which is adapted to mate with an internal flat surface 234 of an oxygen mask 200' providing alignment of an oxygen inlet valve 210, vent valve 206 and cabin air inlet valve 208 on the oxygen mask with an inlet valve 170 vent valve 74 and plug, respectively, on the protrusion 70'. In addition, a resilient locking element 236 on the oxygen mask 200' engages a groove 232 on the protrusion 70' when the oxygen mask 200' is installed releasably securing the oxygen mask to the protrusion.

10 Claims, 16 Drawing Figures

COMPATIBLE SMOKE AND OXYGEN MASKS FOR USE ON AIRCRAFT

TECHNICAL FIELD

This invention relates to the field of smoke and oxygen masks and, in particular, a smoke mask and oxygen mask that can be coupled together for use in an aircraft.

BACKGROUND ART

In recent years great strides have been made in reducing the possibility of a fire aboard an aircraft. These improvements have dealt primarily with the use of new fire-resistant materials in the interior portions of the cabin. While these materials slow the spread of a fire, there is still the problem of toxic smoke produced by these smoldering materials. If the fire breaks out while the aircraft is at altitude, which can range up to 40,000–45,000 feet, a considerable amount of time will elapse before the aircraft can land and the passengers exit the aircraft. During this time there is a need to provide protection for the passengers. In the past the only protection offered was the use of a wet cloth placed over the face of the individual passengers and the instruction to lie as low to the floor as possible. However, it is vital during a panic situation to keep passengers in their seats as long as possible to avoid blocking access to the fire source and to maintain orderly evacuation. Also, in a crash landing where the aircraft is engulfed by fire there is no protection for the passenger from the time he leaves his seat to the point he is clear of the burning aircraft. Hence, he has no protection from falling droplets of burning materials, toxic gases, smoke inhalation or singed lungs. These are clearly not ideal solutions to the problem.

Basically, any smoke mask for a passenger on board an aircraft must have the following attributes.

1. It must be storable in a compact package and quickly accessible.
2. It must be capable of coupling to a source of fresh air from the aircraft's environmental control system.
3. It must also have a self-contained air or oxygen supply which can be activated in an emergency once the aircraft is on the ground so that the passenger will have breatheable air during the exiting process.
4. There must also be a means to disengage from the aircraft's environmental control system fresh air supply.
5. Optionally, there must also be a way to couple the smoke mask to the existing or slightly modified aircraft oxygen mask should decompression, fire and/or simultaneously smoke occur. This connection is necessary to insure that air/oxygen is available during aircraft descent from altitude.

It must be noted that it is standard airline procedure not to drop oxygen masks or to release oxygen when there is fire onboard for fear of adding fuel to the fire. But should there be a decompression due to fuselage burn through or other reason, such as, a window blow-out, it may become a requirement to deploy the existing oxygen mask, regardless of smoke environment.

There are numerous prior art smoke masks. Examples of smoke masks that provide self-contained air or oxygen breathing apparatus are: U.S. Pat. No. 456,687, "Fireman's Smoke Protector," by W. Bader; U.S. Pat. No. 1,945,919, "Life Saving Mask," by M. F. Seijo; U.S. Pat. No. 2,850,011, "Respiratory Helmet," by P. Schaefer; U.S. Pat. No. 3,521,629, "Heat and Smoke Protective Hoods," by H. I. Reynolds; U.S. Pat. No. 3,762,407, "Survival Support Device," by David E. Shonear; U.S. Pat. No. 3,976,063, "Escape Breathing Apparatus," by John W. Henneman, et al. None of these, however, disclose a method of coupling to a source of external air.

U.S. Pat. No. 521,939, "Fire Mask," by G. Pozdena, et al, discloses a mask which can be hooked up to a source of external air, so this feature by itself is old in the art. But none appear to combine the two features which are a necessity onboard an aircraft.

Oxygen masks for aircraft passengers, typically, comprise a hollow flexible cup-shaped member having a flat front face. On the face are mounted an oxygen inlet valve coupled by a line to a source of oxygen gas, a vent valve to exhaust exhaled air and a cabin air inlet valve (all simple check valves). Additionally, an elastic strap is provided for securing the mask to the passenger's head. The mask is generally stored above the passenger in a sealed compartment. Should decompression occur, the door is opened automatically and the mask drops in front of the passenger. The passenger(s) need only pull the mask toward themselves to initiate oxygen flow. Typically, solid state gas generators are used. The oxygen gas flow to the mask is only about 3 to 5% of the total air flow required and the majority of the air is drawn through the cabin air inlet valve. Thus, it can be seen that in a fire situation, the oxygen mask alone would be of little value in protecting the passenger against smoke.

Examples of aircraft oxygen masks are provided in U.S. Pat. No. 2,931,355, "System for Automatically Presenting a Breathing Mask to a Person in an Emergency," by A. E. Miller, et al; U.S. Pat. No. 3,073,301, "Aviation Quick Release Valve," by W. W. Hay, et al; U.S. Pat. No. 3,981,302, "Emergency Breathing Means," by Herbert F. Veit; U.S. Pat. No. 4,154,237, "Passenger Emergency Oxygen Mask Drop Zone Extender," by Jack P. Courter.

Thus, it is a primary object of the subject invention to provide a smoke mask which can be coupled to a compatible oxygen mask should a decompression occur concurrent with a fire onboard the aircraft or in which toxic gases or dense smoke are present.

It is a further object of the subject invention to provide a compatible smoke mask and oxygen mask wherein the oxygen mask can be releasably mounted to the smoke mask should a simultaneous fire and decompression occur.

It is another object of the subject invention to provide a compatible smoke mask and oxygen mask wherein the smoke mask can be coupled to a source of fresh air from the environmental control system of an aircraft and also incorporates a self-contained air supply and further having means to first actuate the supply of self-contained air and thereafter disconnect from the source of fresh air.

DISCLOSURE OF THE INVENTION

The invention is a windowed smoke mask and oxygen mask for use by passengers in an aircraft cabin, the aircraft having a source of pressurized fresh air and oxygen gas.

The smoke mask comprises a container of pressurized air or chemical oxygen, incorporating a flow control valve means mounted to the smoke mask. A first conduit means is coupled to the flow control valve means and is adapted to deliver the flow of gas to the interior of the face mask upon the opening of the flow control valve means. The smoke mask is provided with a vent valve means mounted thereon which is adapted to vent exhaled air from the interior thereof.

A second conduit means is coupled to the source of pressurized fresh air. Disconnect valve means is provided for coupling the second conduit to the interior of the face mask and which is further adapted when actuated to disconnect the second conduit means from the face mask and to seal off the interior thereof. A lanyard means is coupled to both the control valve means and the disconnect valve means and when actuated is adapted to open the control valve means and to actuate the disconnect valve means separating the second conduit from the smoke mask.

Additionally, a manually operated inlet valve biased to the closed position is mounted to the mask. The smoke mask is configured so as to be capable of receiving and mounting a oxygen mask of the type typically used on aircraft.

The oxygen mask is a conventional type modified so as to be securable to the smoke mask. The oxygen mask comprises a hollow flexible cup adapted to fit over the nose and mouth of the passenger having a flat face end portion The end portion incorporates an oxygen inlet valve, coupled via a line to a source of oxygen gas, a cabin air inlet valve and a vent valve. The oxygen mask is modified by incorporation of an internal flat surface adapted to make the external flat surface on the protrusion of the smoke mask. This ensures that when the oxygen mask is coupled to the smoke mask, proper alignment of the oxygen inlet valve, vent valve, and cabin air inlet valve are aligned with the inlet valve, vent valve and plug, respectively, on the smoke mask. Additionally, a groove is provided on the protrusion and a mating resilent locking element is provided on the interior of the cup portion of the oxygen mask. Thus, when the oxygen mask is installed, the locking element releasably locks in the groove securing the oxygen mask to the smoke mask. To accomplish this function the smoke mask is provided with a protrusion with the vent valve and inlet valve mounted at the end thereof so as to be aligned with the inlet and vent valves on the conventional oxygen mask when the oxygen mask is mounted thereto. Means are also provided on the protrusion to seal off the cabin air intake valve of the oxygen mask.

Thus, not only is smoke protection provided in case of a fire but if there is also a decompression a source of oxygen can be coupled to the smoke mask by means of a conventional (or one slightly modified) oxygen mask. Also, in an emergency, after the aircraft has landed, the oxygen mask can be removed and the conduit to the source of pressurized fresh air can be disengaged and the container of breatheable gas can be used while the passenger exits the aircraft.

The novel features which are believed to be characteristic of the invention, both as to its organization and its method of operation, together with further objects and advantages thereof, will be better understood from the following description, taken in connection with the accompanying drawings and which presently preferred embodiments of the invention are illustrated by way of examples. It is to be expressly understood, however, that the drawings are for the purposes of illustration and description and are not intended as a definition of the limits of the invention.

BRIEF DESCRIPTION OF THE DRAWINGS

Illustrated in FIG. 1 is a partial perspective view of the interior of an aircraft showing a passenger wearing the smoke mask.

Illustrated in FIG. 2 is a cross-sectional view of a portion of the cabin floor showing a method of providing pressurized fresh air to the smoke mask.

Illustrated in FIG. 3 is a side view of a portion of the face mask partially broken away to show the interior thereof.

Illustrated in FIG. 4 is a cross-sectional view of a disconnect valve adapted to couple a conduit providing fresh air to the face mask.

Illustrated in FIG. 5 is a disconnect valve shown in FIG. 4 in the actuated position with the conduit disengaged.

Illustrated in FIG. 6 is an alternate design for the disconnect valve illustrated in FIG. 4 and 5.

Illustrated in FIG. 6a is a cross-sectional view of the disconnect valve illustrated in FIG. 6 along the line 6a.

Illustrated in FIG. 7 is a cross-sectional view of an air intake valve mounted to the face mask.

Illustrated in FIG. 8 is a cross-sectional view of the air intake valve illustrated in FIG. 7 in the actuated position.

Illustrated in FIG. 9 is an alternate design of the intake valve illustrated in FIG. 7.

Illustrated in FIG. 10 is a partial perspective view of the interior of the aircraft showing a passenger with the smoke mask mounted thereon and, additionally, a conventional oxygen mask deployed but not attached to the smoke mask.

Illustrated in FIG. 11 is a perspective view of a protrusion on the smoke mask adapted to receive a conventional oxygen mask.

Illustrated in FIG. 12 is a partial perspective view of the oxygen mask showing the cabin intake valve, oxygen intake valve and the exhaust valve.

Illustrated in FIG. 13 is a side view of the smoke mask showing the conventional oxygen mask mounted thereon.

Illustrated in FIG. 14 is a partial view of an oxygen mask strap retaining clip mounted to the face mask.

Illustrated in FIG. 15 is a partial perspective view of the smoke mask and oxygen mask modified to incorporate alignment surfaces and attachment provisions.

Illustrated in FIG. 16 is a partial cross-sectional side elevation view of the FIG. 15 combination showing smoke mask and the oxygen mask joined.

BEST MODE FOR CARRYING OUT THE INVENTION

Figure 1:
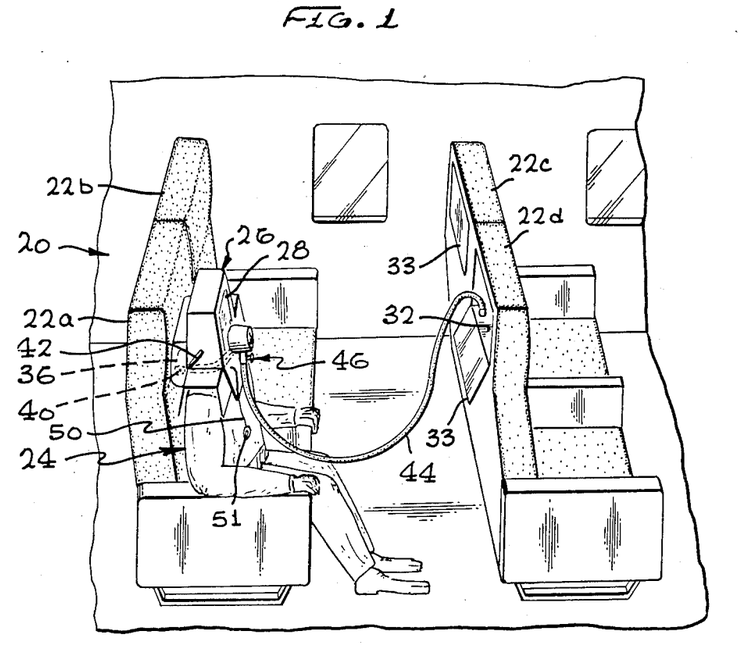
Figure 10:
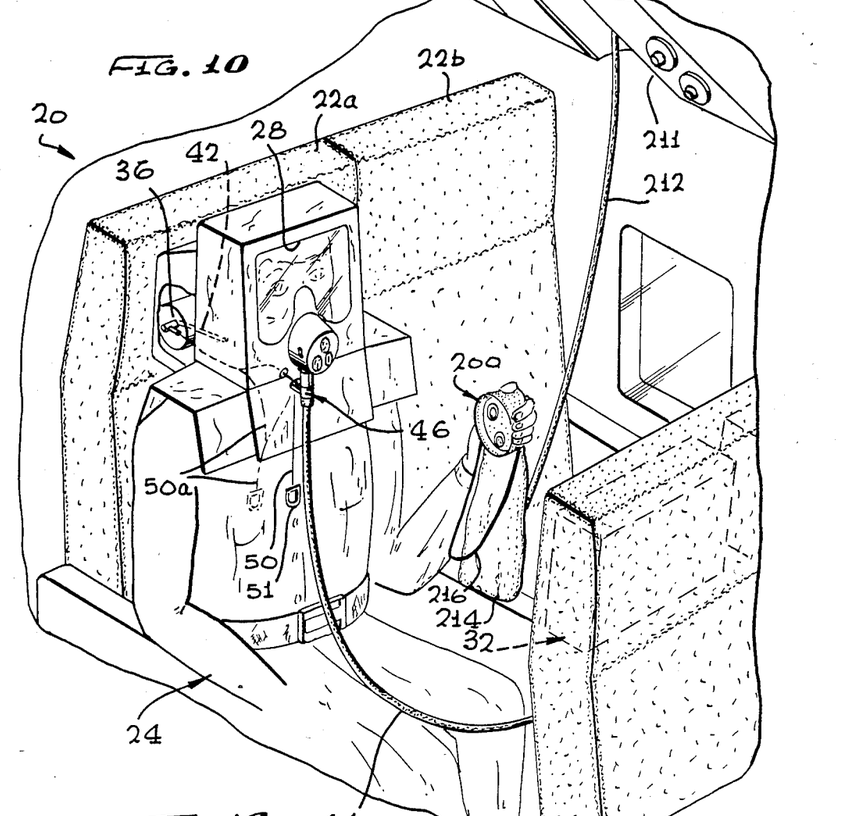

Illustrated in FIGS. 1 and 10 are partial perspective views of the interior of an aircraft cabin showing a passenger in a seated position wearing the subject smoke mask. Referring to FIGS. 1 and 10 it can be seen that the aircraft cabin, generally designated by numeral 20, showing a number of passenger seats 22a, 22b, 22c, 22d, with a passenger, designated by numeral 24 seated in seat 22a. The smoke mask, designated by numeral 26, has a window portion 28 and is of a type which is foldable for storage in a compartment 32 in the seat 22d in front of the passenger 24. The compartment 32 is normally sealed by the cover 33 where release would typically be controlled by the flight crew. A conventional container 36 filled with pressurized breatheable gas (either oxygen or air) is mounted at the back of the mask 26 and incorporates a flow control valve 40. A first conduit 42 is coupled to the valve 40 and is adapted to deliver the gas to the interior of the smoke mask 26.

The smoke mask 26 is coupled by a conduit 44 to a source of pressurized fresh cabin air. Conduit 44 couples to the smoke mask 26 by means of a disconnect valve 46 (the details of which will be subsequently discussed). A lanyard 50 is coupled to both the flow control valve 40 and disconnect valve 46 and is adapted, when pulled, to first open the valve 40 and second to activate disconnect valve 46 separating the conduit 44 from the smoke mask 26.

Figure 2:
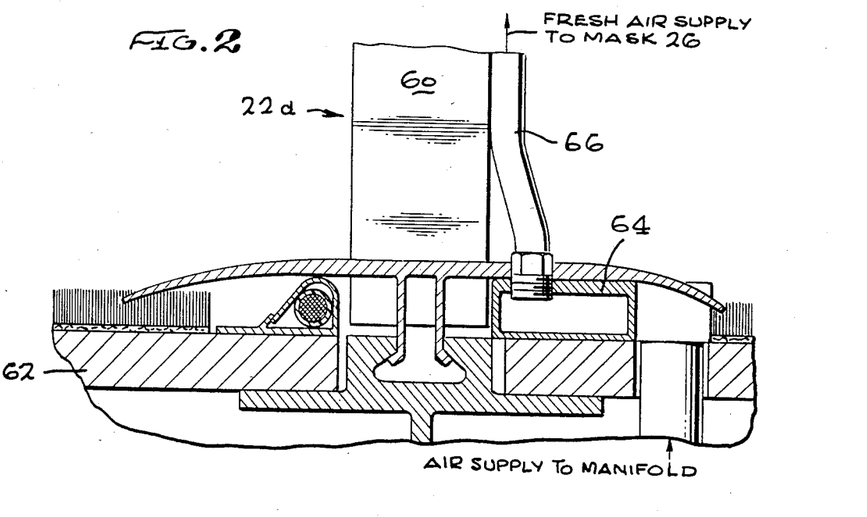

Illustrated in FIG. 2 is a cross-sectional view of a portion of the cabin floor wherein the support leg 60 of the passenger seat 22d is shown mounted thereto. The cabin floor assembly, generally designated by numeral 62, incorporates a duct 64 which is adapted to direct the fresh air (typically from the environmental control system of the aircraft) to the individual seats. A line 66 is coupled to the duct 64 and travels up the seat and couples to conduit 44.

Figures 3, 4, 5:
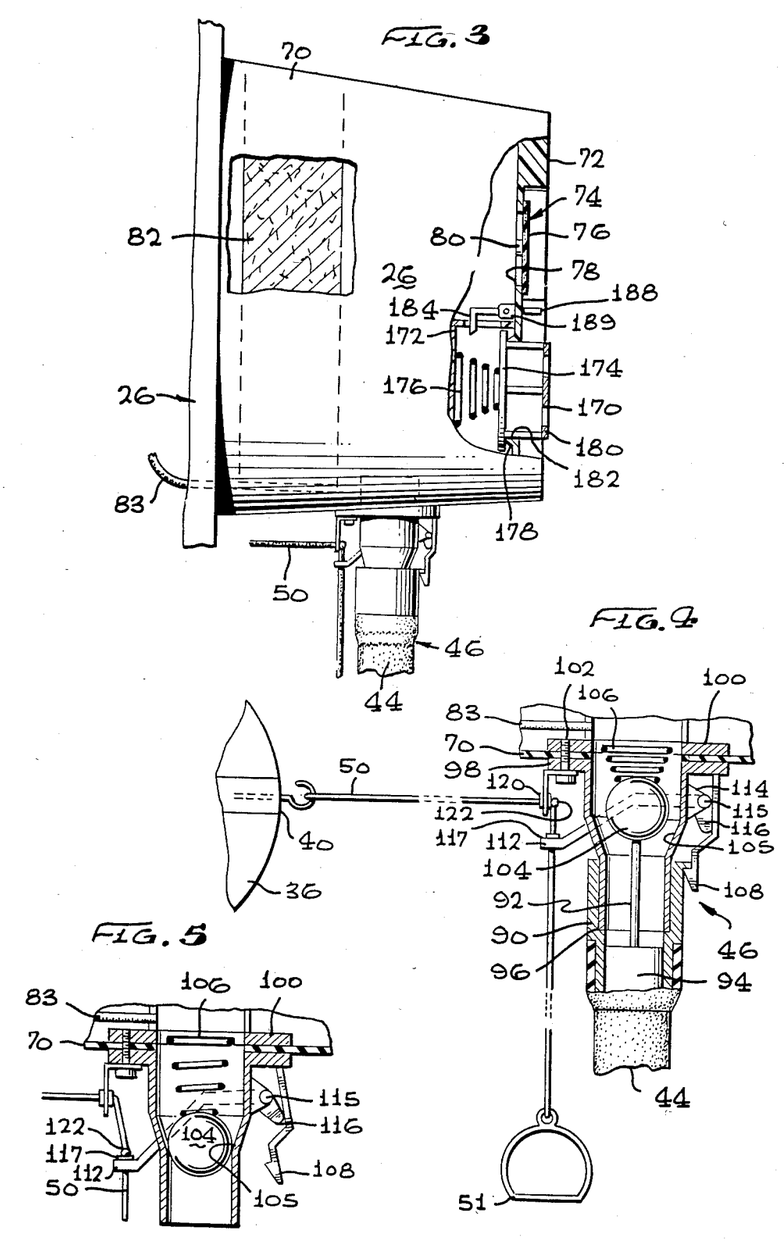

Illustrated in FIG. 3 is a side view of the smoke mask 26 partially broken away to show the interior thereof. It can be seen that the portion of the smoke mask 26 illustrated comprises a hollow protrusion 70 extending forward from the body of the mask terminating in a flat front wall 72. Mounted in the wall 72 is a conventional vent valve, generally designated by numeral 74 which simply comprises a flexible diaphragm 76 covering an aperture 78 in the wall 72. The diaphragm is supported at its center 80 by a plurality of webs (not shown). A replaceable filter 82 is mounted in the protrusion 70 which aids in preventing any toxic fumes from reaching the passenger. A pendant hose 83 is routed from the protrusion 70 to the window portion 28 to provide air to defog the window surface.

Illustrated in FIG. 4 is a cross-sectional view of the disconnect valve 46 shown in FIGS. 1, 3, and 10. The disconnect valve 46 has a first body portion 90 to which the conduit 44 is attached. Mounted within the first body portion 90 is a probe 92 supported by a plurality of webs 94. A second body portion 96 is attached to the protrusion 70. Attachment is accomplished by providing the body portion 96 with a flange 98 which is fastened to an apertured plate 100 mounted within the protrusion 70. Fasteners 102 (only one is shown) secure the body portion 96 to the protrusion 70. The portion 96 contains a valve comprising ball 104 biased toward a seat 105 by spring 106, into contact with the probe 92. A flexible hook member 108 secures the first and second body portions 90 and 96 together. When so secured the ball 104 is maintained in a position out of contact with seat 105 of the body portion 96. Thus, pressurized fresh air traveling up conduit 44 can freely pass through the disconnect valve 46 into the interior of the protrusion 70, through the filter 82, and, thereafter to the passenger.

A lever 112 is pivotally mounted to a bracket 114 secured to the second body portion 96, lever 112 thus being rotatable about pivot point 115. Attached to the lever 112 is a cam member 116 which is in contact with the flexible hook member 108. The lever 112 contains an apertured eyelet 117 through which the lanyard 50 is slidably mounted therethrough. Mounted to the second body portion 96 is an apertured eyelet 120 through which the lanyard 50 is also slidably mounted therethrough. Attached to the lanyard 50 between the eyelet 117 and eyelet 120 is a stop member 122. With the lanyard connected to the flow control valve 40 on the container 36 it can be readily seen that pulling of the ring 51 connected to the end of the lanyard will cause the lanyard 50 to actuate the control valve 40. Continued pulling of the lanyard 50 will cause the stop member 122 to strike the eyelet 120 on the lever 112 causing it to rotate forcing cam member 116 to move the hook member 108 out of engagement with the first body portion 90. This effectively detaches the first body portion 90 from the second body portion 96. Since the spring 106 biases the ball 104 into contact with the probe 92 the spring will tend to force the first body portion 90 out of engagement with the second body portion 96. This is illustrated in FIG. 5 which shows the ball 104 in contact with seat 105 sealing off the interior of the protrusion 70 and the first body portion completely separated. Thus, it can be seen that spring 106, ball 104 and seat 105 form a closed valve.

In summary, when ring 51 is pulled, this configuration sequentially activates a breathable gas supply from container 36 and disconnects conduit 44 from the smoke mask. This ensures that the passenger wearing the mask will have no interruption of breatheable gas.

Figures 6, 6A:
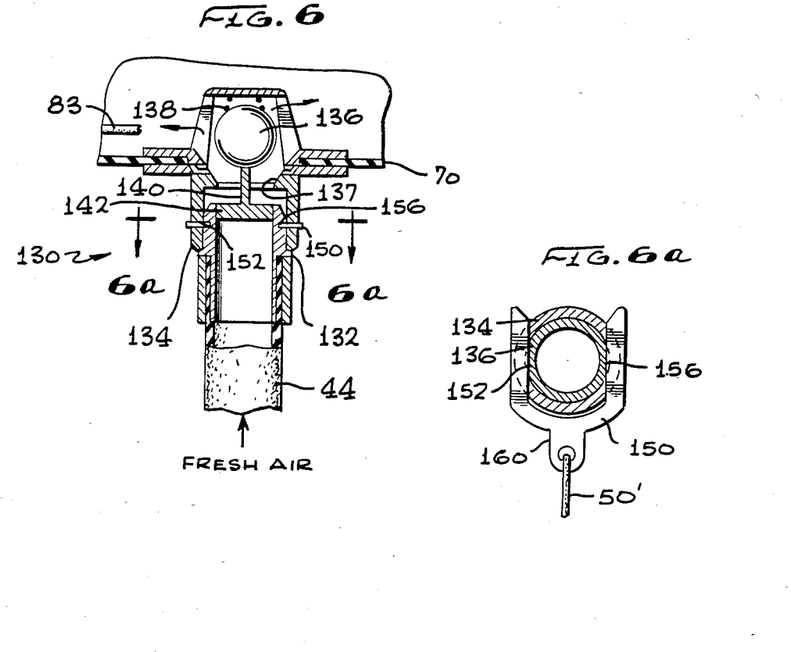

Illustrated in FIG. 6 is an alternate design for a disconnect valve, while illustrated in FIG. 6a is a cross-sectional view of the disconnect valve shown in FIG. 6 along the line 6a. Referring to FIGS. 6 and 6a, it can be seen that the disconnect valve, generally designated by numeral 130 comprises a first body portion 132 coupled to the conduit 44. A second body portion 134 of the disconnect valve 130 is coupled to the protrusion 70 and incorporates a valve comprising a ball 136 spring biased to the closed position against seat 137 by spring 138. The first body portion incorporates a probe 140 held in place by a plurality of webs 142. With the two portions 132 and 134 coupled together, the probe 140 holds the ball 136 off the seat 137. The two body portions 132 and 134 are held together by a snap ring 150 which passes through grooves 152 in the second body portion 134 and into a second set of grooves 156 in the first body portion 132. This effectively holds the two portions together. A lanyard 50a is coupled to a tab 160 mounted to the snap ring 150.

Use of disconnect 130 would require the use of a "Y" shaped lanyard 50a (best illustrated in dotted lines in FIG. 10); i.e., a separate strand going to the flow control valve 40 and to the snap ring 150. In this particular case, there will not be any sequential operation and both the flow control valve 40 and the disconnect of the conduit 44 will be accomplished at essentially the same time.

Figure 7:
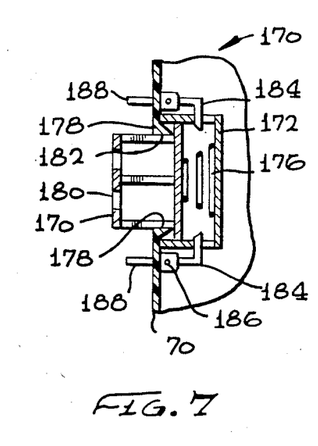
Figures 8, 9:
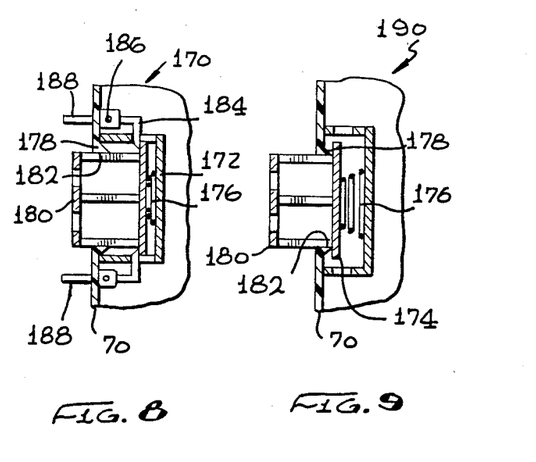

Referring back to FIG. 3 and additionally to FIGS. 7 and 8 which illustrate the open and closed positions of cabin air inlet valve 170, attached to the protrusion 70. Slidably mounted within the housing 172 is a flat disc sealing member 174 which is biased by spring 176 to the closed position wherein the member 174 abuts seal 178. Attached to the member 174 is an apertured button 180 which extends out of the protrusion 70 through aperture 182 to the exterior of the smoke mask. Mounted to the protrusion 70 are a pair of spring mounted retainers 184 having chamfered hooked ends. They are biased to extend partially within the housing 172 by spring members (not shown) and pivot about an axis 186. Each contain a tab 188 which extends out of the protrusion 70 to the exterior of the smoke mask. Thus, to operate the inlet valve 170 one needs only depress the button 180 so that the member 174 slides past the retainers 184 which will spring back locking the inlet valve in the open position, as illustrated in FIG. 8. Pushing the tabs 188 toward each other would allow the valve to return to the closed position.

Illustrated in FIG. 9 is an alternate inlet valve identical to that illustrated in FIG. 7 and 8, except that the retainers 184 are eliminated. Thus, the valve generally designated by numeral 190 has like parts identified by the same numbers as valve 170. Hence, inlet valve 170 as illustrated in FIGS. 7, 8 and valve 190 illustrated in FIG. 9 provide a means to couple a standard emergency oxygen mask to the smoke mask. Note, also, in the event that the pressurized source of fresh air is turned off before the hood is removed, cabin air is available by depressing valve 170 or 190, whichever is used.

Figure 11:
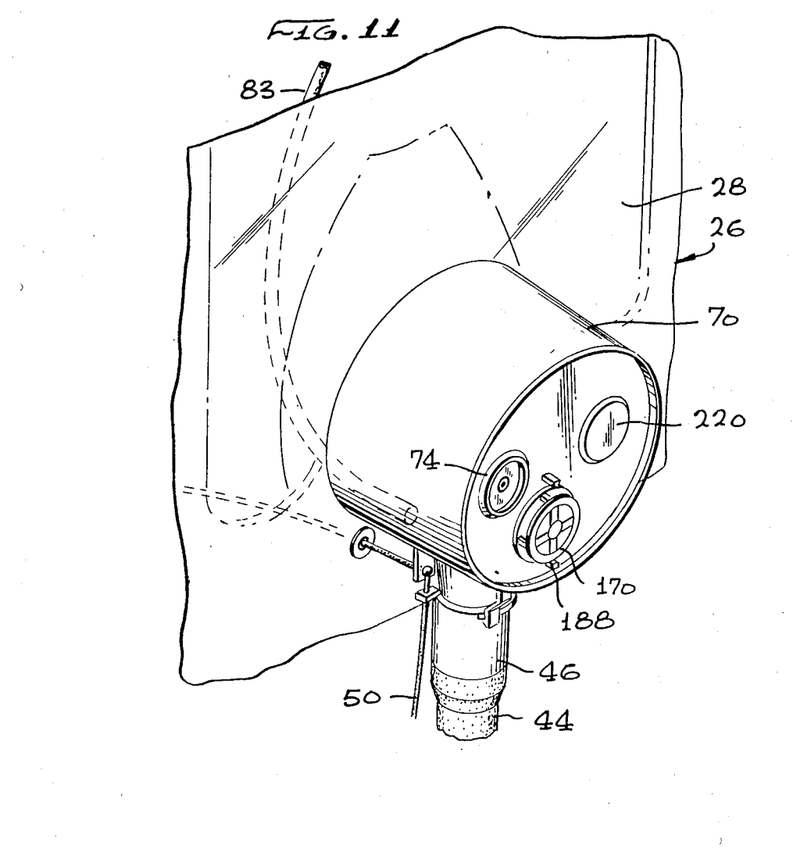
Figure 12:
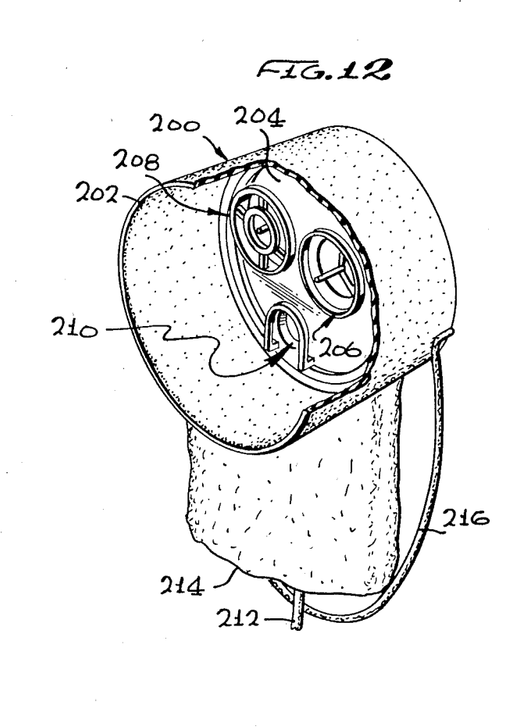
Figure 13:
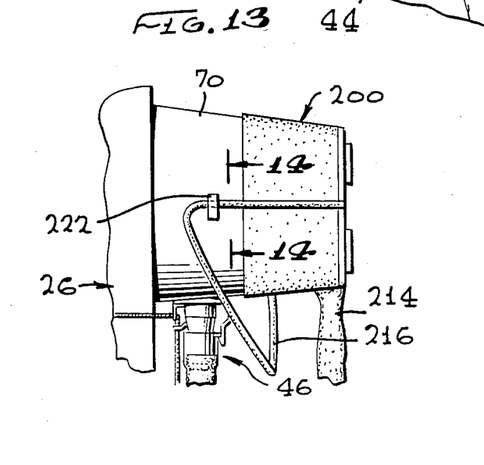

Illustrated in FIG. 11 is partial perspective view of the smoke mask while illustrated in FIG. 12 is a view of a conventional emergency oxygen mask normally found on aircraft. Illustrated in FIG. 13 is a partial view of the smoke mask showing the oxygen mask mounted thereto. Illustrated in FIG. 14 is a partial view of the smoke mask illustrated in FIG. 13 along the line 14—14.

Referring, initially to FIGS. 10 and 12, it can be seen that the conventional oxygen mask designated, by numeral 200, comprises a cup 202 typically made of a flexible material which can be placed over the nose and mouth of the passenger. It has an end plate 204 on which are mounted an exhaust valve 206, a cabin air intake valve 208, and an oxygen intake valve 210. The oxygen mask is typically stored in an overhead compartment 211 and drops down automatically when a decompression occurs. The mask is connected to overhead line 212 which couples to a bag 214 mounted on the mask. The oxygen flows through the bag 214 and through valve 210. Additionally, an elastic band 216 is provided which is used to secure the mask to the passenger's head.

This type of mask is almost universally used on commercial aircraft. In general, the amount of oxygen supplied is only three to five percent of the total air intake, the rest being provided by the air remaining in the cabin via inlet valve 208. This has been deemed sufficient to eliminate undue discomfort to the passengers as the plane descends to a safe altitude. The problem with this oxygen is that it is totally unusable if there is heavy smoke or toxic gas onboard because essentially 95 to 97 percent of the air intake is through valve 208 which is directly coupled to the passenger compartment.

Figure 14:
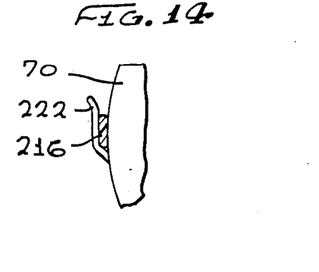

Still referring to FIGS. 10 and 12 in additions to FIGS. 11 and 14, it can be seen that if the exhaust valve 74 of the protrusion 70 and the optional inlet valve 170 are positioned so that the oxygen mask 200 can be placed over the protrusion 70 such that valves 206 and 210 on the oxygen mask are aligned with valves 74 and 170, respectively, on the protrusion 70. This will cause valve 210 to open valve 170 causing oxygen to enter the smoke mask A stop 220 on the protrusion 70 is used to block off inlet valve 208 on the oxygen mask 200.

The oxygen mask 200 can be secured to the protrusion 70 by means of the strap 216 which can be hooked into retaining clip 222 mounted on the protrusion 70. Thus, with pressurized fresh air being supplied by conduit 44 the additional necessary oxygen during a decompression can be supplied by the oxygen mask 200. No smoke filled cabin air can reach the passenger since valve 208 of the oxygen mask 200 is blocked off by stop 220. Thus, not only can the smoke mask 26 protect the passenger from toxic fumes should a fire occur, but additionally can be used in conjunction with the oxygen mask during a simultaneous decompression.

When the aircraft lands, during an emergency, the oxygen mask, if having been deployed, can be removed from the smoke mask 26, thereafter the lanyard 50 can be pulled disconnecting the conduit 44 and initiating the flow of breatheable gas from the container 36 which is designed to provide a supply sufficient to allow the passenger to egress from the aircraft through emergency exits with a good possibility of never having been subjected to toxic fumes.

Figures 15, 16:
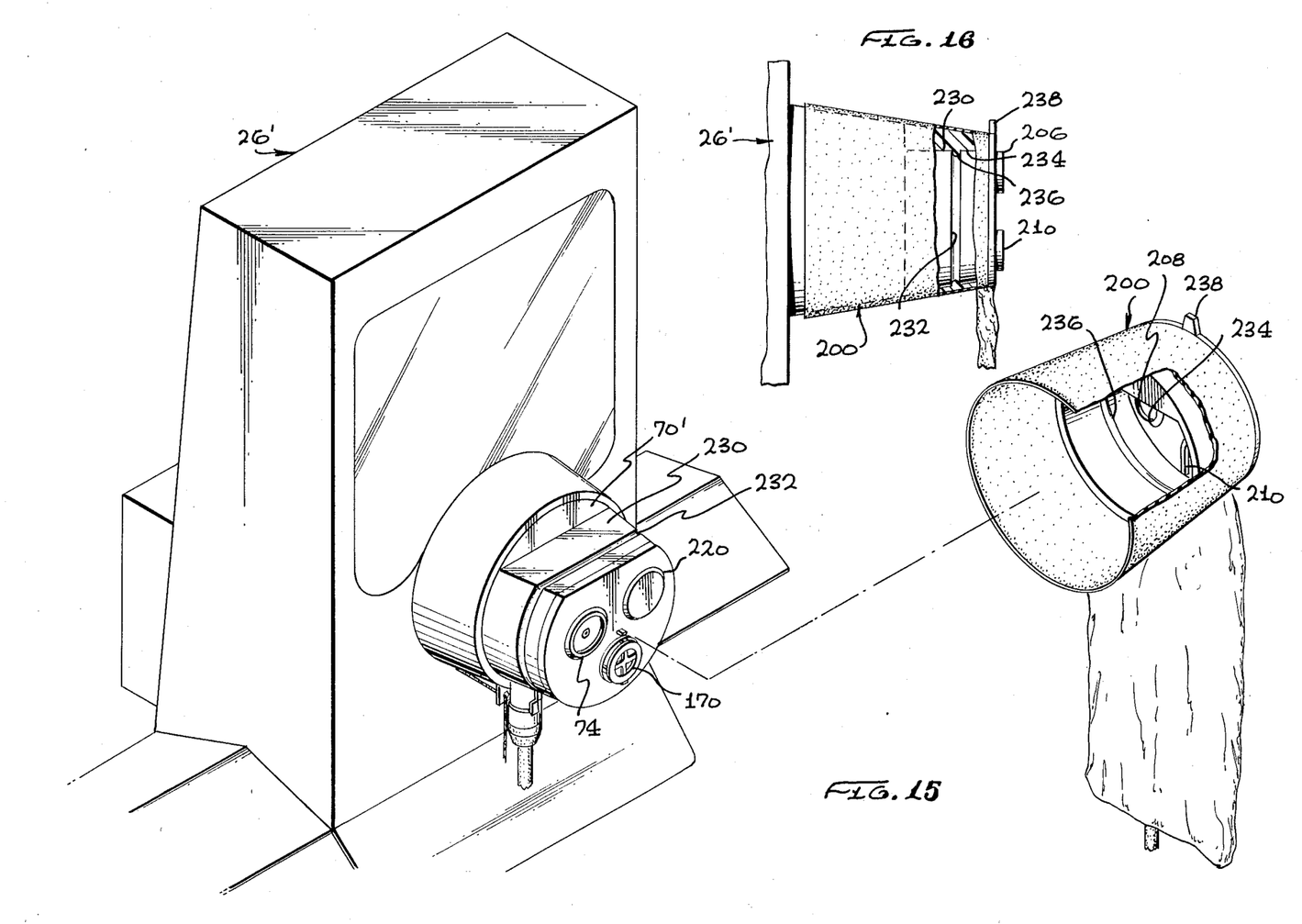

It is desirable that the oxygen mask be easily alignable with the protrusion on the smoke mask when attempting to install it and that attachment be accomplished with minimum effort. Referring to FIGS. 15-16, it can be seen that this can be accomplished by providing attachment means and alignment means on the smoke mask and oxygen mask. A smoke mask 26', similar to smoke mask 26 as illustrated in FIG. 11, is modified by incorporation of a flat 230 on the protrusion 70'. Also incorporated on the protrusion 70' is a groove 232 extending at least partially about the protrusion 70'.

An oxygen mask 200', similar to the oxygen mask shown in FIG. 12 is modified by installation of an internal flat surface 234 within cup 202'. A resilent locking element 236 is also mounted within the cup 202' and is adapted to engage the groove 232 on the protrusion 70' of the smoke mask 26'.

Thus, when the oxygen mask is installed on the protrusion 70' it will only properly fit when the surfaces 230 and 234 are properly aligned. When the smoke mask 200' is properly aligned, one need only push the smoke mask onto the protrusion 70' and the locking element 236 will automatically engage the groove 232, securing the oxygen mask thereto.

Furthermore, when the oxygen mask is installed the alignment of the oxygen inlet valve 210, vent valve 206, and cabin air inlet valve 208 will be properly aligned with inlet valve means 170, vent valve 74 means and plug 220, respectively on the smoke mask. In order to aid the passenger in properly positioning the oxygen mask 200', a tab 238 is attached to the oxygen mask 200' which will indicate the top of the mask.

While the smoke mask 26 or 26' preferably incorporates a container 36 filled with pressurized breatheable air for use during emergency egress from the aircraft, in some instances it may not be an absolute necessity. For example, on small aircraft the time to exit may be of such short duration that the container will be unnecessary because the built-in filter will permit breathing of cabin air. This may be especially true if the passengers have been also coupled to the oxygen mask.

While the smoke mask has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The smoke mask and oxygen mask have application in aircraft interiors providing passenger protection from toxic fumes and the like.

We claim:

1. An improvement to a windowed smoke mask and oxygen mask, said oxygen mask of the type comprising a hollow flexible cup having a substantially flat end surface, said end surface incorporating an oxygen inlet port, a vent port, a cabin air inlet port, and a flexible mounting strap mounted thereto, said smoke mask and said oxygen mask for use by passengers in an aircraft cabin, said aircraft having a source of pressurized fresh air and oxygen gas, the improvement being a system for coupling said oxygen mask to said smoke mask comprising:

a protrusion mounted on the front of said smoke mask, said protrusion having a substantially flat face, said protrusion adapted to receive said oxygen mask;

a vent valve means mounted on said flat face of said protrusion in a manner such that it is aligned and coupled to said vent valve of said oxygen mask when said oxygen mask is mounted on said protrusion;

an inlet valve means biased to the closed position mounted on said flat face of said protrusion, said inlet valve means having an actuation button protruding to the exterior thereof, said intake valve means mounted in such a manner that it is aligned and coupled with said oxygen inlet valve of said oxygen mask when said oxygen mask is mounted on said protrusion;

plug means mounted on said flat face of said protrusion adapted to plug said cabin air inlet valve on said oxygen mask when said oxygen mask is mounted to said protrusion;

a conduit means coupled to said source of fresh air;

disconnect valve means coupling said conduit means to said interior of said smoke mask adapted, when actuated, to disconnect said conduit means from said face mask and further adapted to seal off the interior of said smoke mask;

lanyard means coupled to said disconnect valve means adapted when actuated to actuate said disconnect valve means;

attachment means coupled to both said smoke mask and said oxygen mask adapted to attach said oxygen mask to said smoke mask; and alignment means coupled to both said smoke mask and said oxygen mask adapted to align said oxygen inlet valve, said vent valve and said cabin air inlet valve of said oxygen mask with said intake valve means, said vent valve means and said plug means, respectively, of said smoke mask when said oxygen mask is mounted to said protrusion.

2. The invention as set forth in claim 1 further including strap retaining means mounted on said smoke mask adapted to releaseable retain said strap means of said oxygen mask in a manner such that said oxygen mask is securable to said protrusion.

3. The smoke mask as set forth in claim 2 wherein said alignment means comprises:

said protrusion in the form of a truncated conical shape with an external flat surface formed thereon; and said hollow flexible cup of said oxygen mask also in the form of a truncated cone, said cup incorporating an internal flat surface, said internal flat surface adapted to mate with said external flat surface on said protrusion when said oxygen mask is installed on said smoke mask in a manner such that said oxygen inlet valve, said vent valve and said cabin air inlet valve are aligned with said inlet valve means, said vent valve means and said plug, respectively, on said protrusion.

4. The invention as set forth in claim 3 wherein said attachment means comprises:

said protrusion incorporating a groove at least partially about the periphery thereof; and a resiliant locking member mounted in the interior of said cup of said oxygen mask adapted to releasably engage said groove such that when said oxygen mask is installed on said smoke mask said oxygen mask will releasably lock to said smoke mask.

5. The invention as set forth in claim 4 including:

a container of pressurized breatheable gas mounted to said smoke mask, said container having a flow valve control means; and a conduit coupled to said flow control valve means adapted to deliver said breatheable gas to the interior of said smoke mask upon the opening of said control valve means; and said lanyard means additionally coupled to said control valve means adapted to open said control valve means.

6. The invention as set forth in claim 5 wherein said smoke mask incorporates latching means adapted to releasably hold said inlet valve means in said open position.

7. The invention as set forth in claim 6 further including a pendant hose means coupled to said disconnect valve means adapted to direct fresh air to the inside surface of the window to defog said window.

8. The invention as set forth in claim 7 wherein said disconnect valve means comprises:

a first body portion coupled to said second conduit means, said first body portion having a probe mounted therein;

a second body portion attached to said smoke mask, said second body portion having a valve spring biased toward the closed position, said second body portion in detachable engagement with said first body portion in such a manner that said probe maintains said valve in said open position; and latch means coupled to said lanyard means releaseably holding said first and second body portions together.

9. The invention as set forth in claim 8 wherein:

said latch means has an operating lever with an aperture therethrough;

said disconnect valve means has a flange member with a second aperture therethrough; and said lanyard means comprising a flexible line having a first end coupled to said flow control valve means and a second end coupled to a pull ring, said flexible line paassing through said first and second apertures, said lanyard having a stop member attached thereto between said first and second apertures with said stop member being larger than said second aperture;

such that when said ring is pulled said flow control valve is immediately opened and said disconnect valve means is actuated upon said stop member reaching said lever.

10. The invention as set forth in of claim 3 wherein said attachment means comprises strap retaining means mounted on said smoke mask adapted to releasably retain said strap of said oxygen mask in a manner such that said oxygen mask is securable to said protrusion.

* * * * *